Jan. 29, 1924.

F. Z. BARRUNDIA 1,481,820

PUMP

Filed May 13, 1922  2 Sheets-Sheet 1

WITNESSES

INVENTOR
FREDERICO ZORRILLA
BARRUNDIA
BY
ATTORNEYS

Jan. 29, 1924. 1,481,820
F. Z. BARRUNDIA
PUMP
Filed May 13, 1922  2 Sheets-Sheet 2
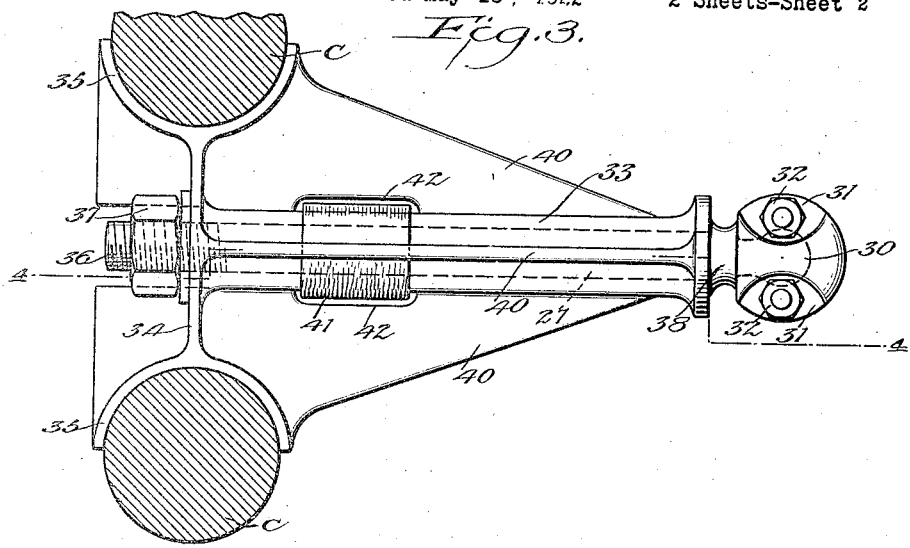
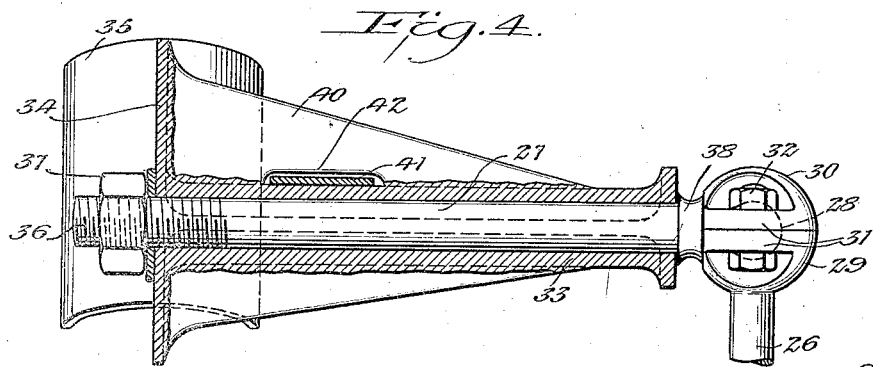
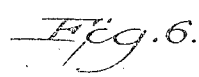
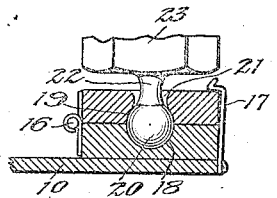
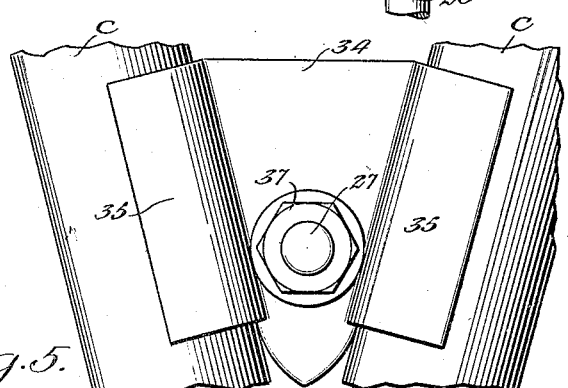
INVENTOR
FREDERICO ZORRILLA BARRUNDIA
BY
ATTORNEYS
WITNESSES Patented Jan. 29, 1924.

1,481,820

UNITED STATES PATENT OFFICE.

FEDERICO ZORRILLA BARRUNDIA, OF OAXACA, MEXICO.

PUMP.

Application filed May 13, 1922. Serial No. 560,784.

*To all whom it may concern:*

Be it known that I, FEDERICO ZORRILLA BARRUNDIA, a citizen of Mexico, and a resident of Oaxaca, Mexico, have invented a new and Improved Pump, of which the following is a full, clear, and exact description.

This invention has relation to pumps and has particular reference to an air pump for inflating the pneumatic tires of motor vehicles.

As an object the invention contemplates in connection with a pump of the character described means for actuating the pump by utilizing the motive power of the vehicle through the medium of one of the rear driving wheels.

As a further object the invention contemplates in connection with a pump of the character described and operable in the manner set forth, means associated therewith for lifting and maintaining the driving wheel with which the pump is associated out of contact with the ground whereby through the medium of the differential the operation of the elevated wheel only is effected.

As a further object the invention contemplates a device of the character described which is extremely simple in its construction and method of operation, readily associated with or disassociated from the vehicle and which is capable of folding and collapsing into a small and compact article for the purpose of storage or transportation when not in use.

With the above recited and other objects in view, the invention resides in the novel construction set forth in the following specification, particularly pointed out in the appended claims and illustrated in the accompanying drawings, it being understood that the right is reserved to embodiments other than those actually illustrated herein to the full extent indicated by the general meaning of the terms in which the claims are expressed.

In the drawings—

Fig. 3 is a fragmentary transverse sectional view taken approximately on the line 3—3 of Fig. 1.

Fig. 4 is a sectional view taken on the line 4—4 of Fig. 3.

Fig. 5 is a rear side view.

Fig. 6 is a detail fragmentary sectional view taken approximately on the line 6—6 of Fig. 1.

Figure 1:
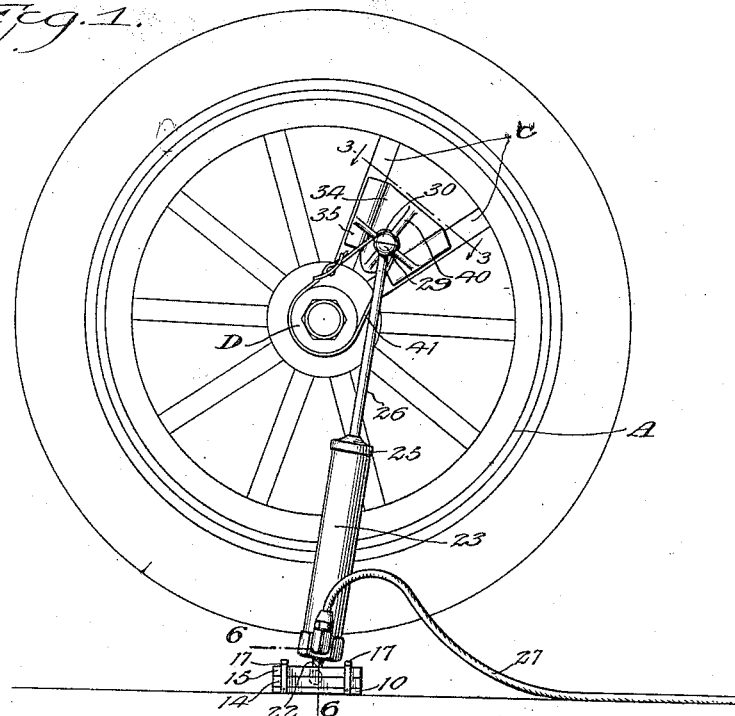
Figure 1 is a side elevation of the pump operatively associated with the drive wheel of a vehicle.

Referring to the drawings by characters of reference, A designates the rear driving wheel of a motor vehicle which is carried by the rear axle housing V and is provided with the usual block C. The device constituting the invention includes a base 10 from the inner end of which a hollow jack standard 11 is vertically disposed and within which the movable stem 12 of the lifting jack is telescopically adjustable to effect relative movement of the supporting head 13 thereof toward and away from the base 10 and the standard 11. At the outer end of the base a bearing consisting of a stationary section 14 and a movable section 15 hingedly connected thereto as at 16 is provided. The bearing sections are maintained in closed relation by the spring catches 17 and the same are provided with complementary semi-spherical sockets 18 and 19 which are designed to coact with a ball 20 when in closed relation. The bearing section 15 is provided with a central opening 21 which communicates with the socket 19 thereof to receive and accommodate the stem 22 constituting a connection between the ball or spherical head 21 and the lower end of a pump barrel 23. The pump barrel 23 is of the usual cylindrical construction and has mounted therein the ordinary piston or plunger 24 which is adapted for reciprocation between the lower end of the barrel and the cap 25 at its upper end. The plunger or piston 24 is connected to a plunger or piston rod 26 extending through the cap 25. The pump is provided with the usual inlet and outlet valves not shown and a flexible tubular conduit 27 communicates with the outlet for the purpose of conveying the air to any suitable point for inflating the tires. The means for eccentrically connecting the plunger or piston rod 26 with the wheel A to effect reciprocations of the plunger from the motor of the vehicle through the medium of the rear wheel consists in providing on said rear driving wheel an axially projecting eccentric crank 27 which is provided at its outer free end with a ball or spherical head 28. The upper end of the piston or plunger rod 26 is provided with a stationary semi-spherical bearing section 29 and a removable semi-spherical bearing section 30 flanged as at 31 to receive the retaining bolts 32 for clamping the sections together to connect the plunger or piston rod 26 with the head 28. The means for associating or connecting the crank 27 to the wheel A consists of a sleeve 33 having connected at its inner end by a web 34 divergent semi-cylindrical yokes 35 which are designed to engage and embrace the confronting peripheries of adjacent spokes. The crank extends through the bore of the sleeve 33 and said crank is threaded at its inner extremity as at 36 to receive a binding nut 37 for impinging the enlarged neck 38 at its outer end against the outer end of the sleeve. Strengthening ribs 40 afford a connection between the yokes 35 and web 34 and the sleeve 33. In order to provide means for retaining the sleeve and its component parts against radial displacement, a strip 41 is employed which is trained around the sleeve through openings 42 in the webs and around the hub D of the wheel.

Figure 2:
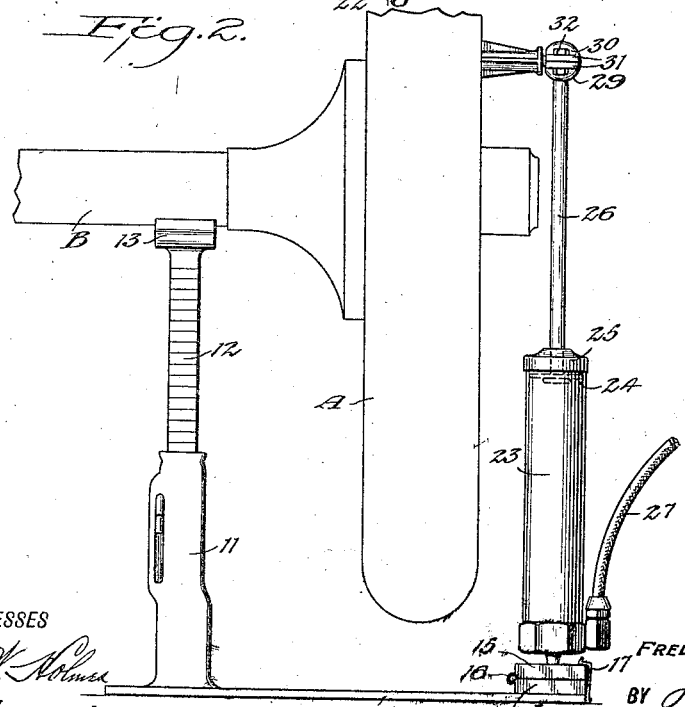
Fig. 2 is a rear view thereof.

In use and operation of the device, one of the rear driving wheels A is jacked up as illustrated in Figs. 1 and 2 by disposing the base 10 transversely under the wheel and supporting the axle housing B on the upper end 13 of the stem 12. The plunger or piston rod 26 is connected to the crank 27 and the motor of the vehicle is started and coupled with the propeller shaft. It is a recognized fact that through the medium of the differential the rear driving wheel which rests on the ground will remain stationary while the elevated driving wheel A illustrated in the drawings will revolve. The revolutions of the driving wheel will impart reciprocatory motion to the piston or plunger rod and piston while the ball and socket connection between the lower end of the pump barrel and the bearing member of the base will compensate for the rocking movement of the pump barrel during reciprocations of the plunger. By this arrangement it will be seen that the tires of the remaining three wheels may be quickly inflated by connecting the flexible hose or conduit 27 to the valve stems thereof. When not in use, the strap 41 is removed, thereby permitting of the removal and disassociation of the sleeve 33 and its component parts from the spokes C. The catches 17 are released to permit of the folding or swinging of the pump barrel downward on the hinge 16 to a position parallel to the base 10, while the stem 12 is telescoped to the full extent within the jack standard 11. In this condition the device is compactly collapsed for storage and transportation.

I claim:

1. A device for inflating the tire of a motor vehicle embodying a base, means for elevating one of the rear driving wheels of the vehicle, a pump barrel connected to the outer end of the base for universal rocking movement, a plunger in the barrel, a plunger rod connected with the plunger and an eccentric crank connected with the free end of the plunger and provided with a base having divergent spoke embracing elements engageable with adjacent spokes, and means extending around the crank and the hub of the wheel for preventing outward radial movement of the crank.

2. A device for inflating the tires of a motor vehicle embodying a base, a lifting jack carried by the inner end of said base for elevating one of the rear driving wheels of the vehicle, a pump having its barrel connected to the outer end of the base for universal rocking movement, and a connection between the free end of the plunger rod and said elevated driving wheel constituting means for actuating the pump plunger by the motive power of the vehicle through the elevated driving wheel, said means of connection consisting of an eccentric crank projecting laterally from the wheel having a universal connection with the outer end of the pump plunger rod, a base on said crank having outwardly divergent semi-cylindrical embracing yokes engaging the confronting sides of adjacent spokes of the wheel, and a strap extending around the hub of the wheel and the crank.

3. In a device of the character described, the combination with a base having a lifting jack for elevating one of the driving wheels of a vehicle and a pump mounted for universal movement on said base, of means for connecting the free end of the plunger rod of the pump eccentrically to the wheel for reciprocating the pump comprising an eccentric crank detachably associated with the driving wheel and connected with the free end of the plunger rod, said crank having a base provided with outwardly diverging spoke embracing sides engageable between adjacent spokes and the driving wheel, and means for maintaining said base against outward radial movement consisting of a strap encircling the crank and the hub of the wheel.

FEDERICO ZORRILLA BARRUNDIA.

Witness:
GEORGE M. HOUSTON.